United States Patent
Ding et al.

(10) Patent No.: US 11,732,076 B2
(45) Date of Patent: Aug. 22, 2023

(54) CYCLIC DIENE-BASED COPOLYMERS

(71) Applicant: Kraton Polymers LLC, Houston, TX (US)

(72) Inventors: Ruidong Ding, Houston, TX (US); Jason Tian, Houston, TX (US); Hannes Hendrik Peter van Erp, Amsterdam (NL); Chad Reiter, Savannah, GA (US)

(73) Assignee: KRATON CORPORATION, Houston, TX (US)

( * ) Notice: Subject to any disclaimer, the term of this patent is extended or adjusted under 35 U.S.C. 154(b) by 374 days.

(21) Appl. No.: 17/301,488

(22) Filed: Apr. 5, 2021

(65) Prior Publication Data

US 2021/0309779 A1 Oct. 7, 2021

Related U.S. Application Data

(60) Provisional application No. 62/704,652, filed on May 20, 2020, provisional application No. 63/005,635, filed on Apr. 6, 2020.

(51) Int. Cl.
| | | |
|---|---|---|
| C08F 236/04 | (2006.01) | |
| C08J 5/24 | (2006.01) | |
| C08F 232/04 | (2006.01) | |
| C08F 136/04 | (2006.01) | |
| C08F 132/06 | (2006.01) | |
| C08L 45/00 | (2006.01) | |

(52) U.S. Cl.
CPC ........ C08F 236/045 (2013.01); C08F 132/06 (2013.01); C08F 136/045 (2013.01); C08F 232/04 (2013.01); C08J 5/244 (2021.05); C08J 5/248 (2021.05); C08J 2345/00 (2013.01); C08J 2347/00 (2013.01); C08J 2421/00 (2013.01); C08L 45/00 (2013.01)

(58) Field of Classification Search
CPC ................ C08F 236/045; C08F 132/06; C08F 136/045; C08F 232/04; C08J 5/244; C08J 5/248; C08J 2345/00; C08J 2347/00; C08J 2421/00
See application file for complete search history.

(56) References Cited

U.S. PATENT DOCUMENTS

| | | |
|---|---|---|
| 5,312,870 A | 5/1994 | Williams |
| 2006/0014902 A1 | 1/2006 | Mays et al. |
| 2010/0036038 A1 | 2/2010 | Rodgers et al. |
| 2017/0198122 A1* | 7/2017 | Rodgers .................. C08L 7/00 |

FOREIGN PATENT DOCUMENTS

| | | |
|---|---|---|
| WO | 2006002033 A1 | 1/2006 |
| WO | 2012050658 A1 | 4/2012 |
| WO | 2012050666 A1 | 4/2012 |
| WO | 2016043851 A1 | 3/2016 |

* cited by examiner

*Primary Examiner* — Edward J Cain

(57) ABSTRACT

Disclosed herein are copolymers formed by cationic polymerization of one or more cyclic dienes and a comonomer selected from the group consisting of a monoterpene, a branched styrene, and combinations thereof, in the presence of a catalyst. Random copolymers having repeat units derived from a cyclic conjugated diene, such as 1,3-cyclohexadiene, and a comonomer such as a monoterpene, can be prepared as soluble products in hydrocarbon solvents. The copolymers can be crosslinked with various crosslinking agents to form materials having good oxidative stability and fire retardancy. The uncrosslinked and crosslinked copolymers have useful properties such as a low dissipation factor, low dielectric constants, and a good balance of thermomechanical and electrical properties that make them valuable in electronic applications.

20 Claims, 1 Drawing Sheet

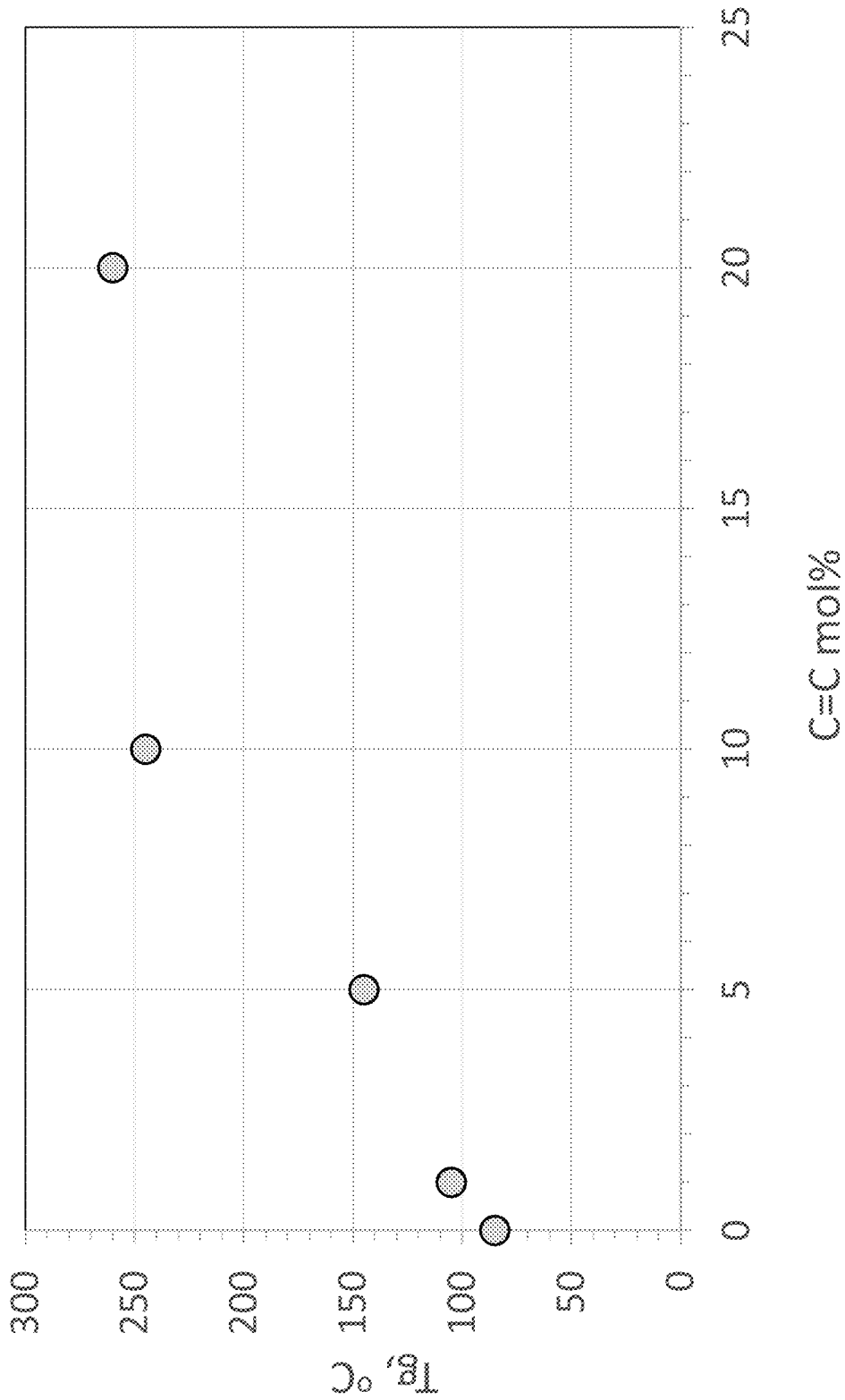

CYCLIC DIENE-BASED COPOLYMERS

RELATED APPLICATIONS

This application claims benefit to U.S. provisional application Ser. No. 63/005,635 with a filing date of Apr. 6, 2020, and Ser. 62/704,652 with a filing date of May 20, 2020, the entire disclosures are incorporated herein by reference.

FIELD

The present disclosure relates to polymers based on cyclic dienes, methods for making the polymers, and their applications.

BACKGROUND

Over the past half century, low dielectric materials having a myriad of electrical, thermal, chemical, and mechanical properties have been intensively researched by ceramic and polymer scientists. In many cases, the applications of low dielectric constant materials are dictated by these properties, and the choice of low dielectric material may have a tremendous effect on a device's performance and lifetime. The rapid development of the microelectronics industry has also spawned an ever increasing demand for more advanced processes and materials for such applications. The trend towards miniaturization of electronic components has also intensified the search for dielectric materials having optimal electrical and functional performance characteristics, such as for example, a desirable combination of electrical, thermal, chemical, adhesive and mechanical properties.

Therefore, there is a continued need for polymeric materials having desirable properties for electronic applications, such as high hydrolytic stability, very low moisture absorption, good processability, high glass transition temperature (Tg), low density, and superior dielectric properties.

SUMMARY

In one aspect, a copolymer is disclosed. The copolymer is formed by cationic polymerization of one or more cyclic dienes and a comonomer selected from the group consisting of a monoterpene, a branched styrene, and combinations thereof, in the presence of a catalyst. The comonomer is selected from the group consisting of a monoterpene, a branched styrene, and combinations thereof. The cyclic diene is selected from the group consisting of 1,3-cyclohexadiene (CHD), cyclopentadiene (CPD), 1,3-cycloheptadiene, 4,5,6,7-tetrahydroindene, norbornadiene (NBD), and combinations thereof. The catalyst is selected from the group consisting of a Bronsted acid, a Lewis acid, and combinations thereof. The copolymer has a Mn of 300-5,000 Dalton and a Mz of 2000-30,000 Dalton. The copolymer has a solubility in a hydrocarbon solvent of 0.1 to 2 g of the copolymer per gram of the hydrocarbon solvent, and a Tg of 80° C. to 180° C.

In another aspect, a method for forming the copolymer is disclosed. The method comprises cationically polymerizing a monomer comprising one or more cyclic dienes and a comonomer in the presence of a catalyst and in a hydrocarbon solvent, to form the copolymer; and isolating the copolymer. The comonomer is selected from the group consisting of a monoterpene, a branched styrene, and combinations thereof; and the catalyst is selected from the group consisting of a Bronsted acid, a Lewis acid, and combinations thereof.

Other aspects of the disclosure include a crosslinked polymer formed by reaction of the above copolymers with a crosslinking agent, and use of the uncrosslinked copolymer for forming a pre-preg for electronic applications.

BRIEF DESCRIPTION OF FIGURES

FIG. 1 is a plot showing the variation of Tg of a crosslinked copolymer resin as a function of the mole % of C=C present in the pre-crosslinked copolymer resin (B), made using CHD and alpha pinene in a weight ratio of 50:50, respectively.

DESCRIPTION

The following terms will be used throughout the specification and will have the following meanings unless otherwise indicated.

$M_w$, weight average molecular weight, describes the molecular weight average distribution calculated according to:

$$M_w = \frac{\sum_i N_i M_i^2}{\sum_i N_i M_i}$$

where $N_i$ is the number of molecules of molecular weight $M_i$.

$M_n$ is the number average of the molecular weights, calculated according to:

$$M_n = \frac{\sum_i N_i M_i}{\sum_i N_i}$$

where $N_i$ is the number of molecules of molecular weight $M_i$.

$M_z$ is a higher order molecular weight average, or the third power molecular weight, which is calculated according to:

$$M_Z = \frac{\sum_i N_i M_i^3}{\sum_i N_i M_i^2}$$

where $N_i$ is the amount of substance of species i and $M_i$ is the molecular weight of species i. $M_z$ $M_w$ and $M_n$ can be determined using GPC-SEC method in ASTM D5296 (2005).

Polydispersity index (PDI) is calculated according to: $PDI=M_w/M_n$

Cup and ball (C&B) SP (softening point) may be determined by ASTM E28, or cup and ball (C&B) softening point tests, or ASTM D 6090 Cup and Ball.

Glass transition temperature (Tg) of the resins can be determined according to ASTM D 6604, between 0° C. and 200° C., using a heat up rate of 10° C./min.

"Cyclic diene" means a cyclic compound having 2 double bonds. When the two double bonds form a conjugated system, the cyclic diene is termed "cyclic conjugated diene". "Cyclic diene" includes both a cyclic non-conjugated diene and a cyclic conjugated diene.

Dissipation factor (Df) is defined as the loss rate of electrical energy in a dissipative system.

Dielectric constant (Dk) is defined as the ability of a substance to store electrical energy in an electrical field.

The copolymer, methods for forming them, and uses of the copolymer are further described in more detail as follows.

Copolymer: The copolymer, formed by cationic polymerization of one or more cyclic dienes and a comonomer in the presence of a catalyst, has repeat units derived from the cyclic diene and the comonomer.

In embodiments, the cyclic diene comprises one or more cyclic conjugated dienes, one or more cyclic non-conjugated dienes, or combinations thereof. Non-limiting examples of cyclic conjugated dienes include 1,3-cyclohexadiene (CHD), cyclopentadiene (CPD), 1,3-cycloheptadiene, 4,5,6,7-tetrahydroindene (THI), and combinations thereof. Non-limiting examples of cyclic non-conjugated dienes includes norbornadiene (NBD), 1,5-cyclooctadiene, dicylopentadiene, and combinations thereof. In embodiments, the cyclic diene is selected from CHD, CPD, 1,3-cycloheptadiene, THI, NBD, and combinations thereof.

In embodiments, the cyclic diene is 1,3-cyclohexadiene comprising up to 10 wt. % of 1,4-cyclohexadiene, relative to the overall weight of the cyclic diene. Use of 1,3-cyclohexadiene containing minor amounts of 1,4-cyclohexadiene can be advantageous as no tedious separation of the 1,3- and the 1,4-isomer is necessary.

The comonomer can be one or more members selected from a monoterpene, a branched styrene, and combinations thereof. The monoterpene can be one or more compounds having a general molecular formula of $C_{10}H_{16}$. In embodiments, the monoterpene is selected from α-pinene, β-pinene, limonene, myrcene, ocimene, α-phellandrene, β-phellandrene, farnesene, camphene, α-terpinene, sabinene, γ-terpinene, α-terpinene, 3-carene, and combinations thereof.

The comonomer can also be a branched styrene compound of formula (III) having a substituent R, e.g., an alkyl group, at the C-2 carbon of the olefinic group that is inert to the cationic polymerization conditions.

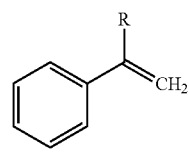

(III)

In embodiments, when a cyclic conjugated diene undergoes cationic polymerization, the product can contain both 1,2-addition units and 1,4-addition units derived from the diene. 1,4-addition is generally favored over 1,2-addition. For example, 1,3-cyclohexadiene undergoes cationic polymerization to give predominantly 1,4-addition units (Formula I) and a minor amount of 1,2-addition units (Formula II).

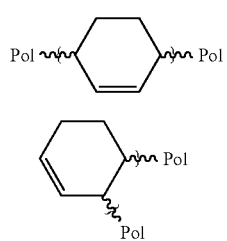

(I)

(II)

The 1,4- to 1,2-relative ratio can be modified by varying the catalyst and reaction conditions. In embodiments, the copolymer comprises 1,4-addition units and 1,2-addition units of the cyclic conjugated diene in a relative molar ratio of 90:10 to 10:90, or 50:50, or 30:70 to 70:30, or 40:60 to 60:40, or 20:80 to 80:20.

Copolymers can be obtained having a wide range of relative mole ratios, e.g., from 5:95 to 95:5 of the cyclic diene and the comonomer, respectively. In embodiments, the copolymer formed by polymerizing 1,3-cyclohexadiene and the comonomer has a relative mole ratio of the cyclic diene and the comonomer ranging from 5:95 to 95:5, or 50:50, or 30:70 to 70:30, or 40:60 to 60:40, or 20:80 to 80:20.

Preparation of the Copolymer: The copolymers can be prepared by cationic polymerization of the one or more cyclic dienes and the comonomer in the presence of a catalyst in a suitable solvent.

Hydrocarbon solvents are preferred as they are generally inert to the catalyst and cationic intermediates generated during the polymerization. Suitable hydrocarbon solvents include aromatic hydrocarbons, alicyclic or aliphatic hydrocarbons, or combinations thereof. Non-limiting examples include hexane, heptane, alkylbenzenes, limonene, turpentine, octane, isooctane, cyclohexane, varnish maker and painter's naphtha (VM&P naphtha), petroleum ether, toluene, xylene, and mixtures thereof.

The catalyst can broadly be a Bronsted acid, a Lewis acid, or combinations thereof. The catalyst can be a Brønsted acid type, a Lewis acid type, or having both Brønsted and Lewis acid type catalytic activity. In embodiments, the catalyst comprises a supported Brønsted acid, an unsupported Brønsted acid, a Lewis acid, a precursor thereof, or combinations thereof. Various non-limiting classes of catalysts can be used, such as organic acids, organic sulfonic acids, organic inorganic acids, acidic zeolites, any Lewis acid based on metals from Groups 3-11, and Groups 12-15 of the Periodic Table of the Elements, and mixtures thereof.

Non-limiting examples include sulfuric acid, phosphoric acid, hypophosphoric acid, polyphosphoric acid, heteropolyacids, such as phosphotungstic acid and silicotungstic acid, 2,2,3-trichlorobutyric acid, 2,5-dichlorobenzene sulphonic acid, chlorosulphonic acid, methanesulfonic acid, p-toluenesulfonic acid, triflic acid, benzenesulphonic acid, 2,5-dichlorobenzenesulphonic acid, beta-naphthol-3,6,8-trisulphonic acid, sulphosalicylic acid, p-toluidine-m-sulphonic acid, sulfonated solid acid derivatives, such as sulfonated styrene-divinylbenzenes, sulfonated silicas, sulfonated fluoropolymers and polystyrene supported sulfonic acids, other types of solid inorganic acid catalyst, for example, but not exclusively, based on silicon, silica, aluminum and/or alumina, such as amorphous silica-alumina having a silica content of 0.1% to 99.9% and/or a pore size of 0.1 ml/g to 5 ml/g and/or a surface area (BET) of 100 to 1000 m²/g, calcined at a temperature of 200° C. to 1000° C., phyllosilicates such as natural or synthetic clays from the kaolin group such as kaolinite, halloysite, dickite or from the smectite group such as montmorillonite, nontronite, hectorite, saponite, or from the illite/mica group such as glauconite, muscovite, paragonite or from the chlorite group such as chamosite, cookeite, nimite, calcined at a temperature of 200° C. to 1000° C., treated, washed, activated or used in conjunction with a mineral acid for example sulfuric acid or hydrochloric acid, altered using salts such as lithium, sodium, magnesium, iron and/or exchanged in a medium such as water, modified or pillared, using aluminum, natural or synthetic microporous aluminosilicates, in proton or cation form, from the zeolite group such as USY, L, Mordenite, Ferrierite, ZSM-5, Beta, having a silica content of 0.1% to 99.9% and/or a pore size of 0.1 ml/g to 5 ml/g and/or a surface area (BET) of 100 to 1000 m2/g, calcined at a temperature of 200° C. to 1000° C.; mesoporous materials, in protonated or cationic form, for example silicaluminophosphates such as SAPO-11, SAPO-34, or for example aluminosilicates such as MCM-41, MCM-48, or for example silicates such as SBA-15, SBA-16, having a silica content of 0.1% to 99.9% and/or a pore size of 0.1 ml/g to 5 ml/g and/or a surface area (BET) of 100 to 1000 m2/g, calcined at a temperature of 200° C. to 1000° C. supported metals for example Ni, Pt, Au, Fe, or Co, treated, washed, activated or used in conjunction with a mineral acid such as sulfuric acid or hydrochloric acid, modified or pillared using aluminum, hydroiodic acid.

In embodiments, the catalyst is a Lewis acid based on metals selected from zinc, boron, aluminum, gallium, indium, titanium, zirconium, tin, vanadium, arsenic, antimony, and bismuth, with illustrative examples including $AlCl_3$, (alkyl)$AlCl_2$, $(C_2H_5)_2AlCl$ and $(C_2H_5)_3Al_2Cl_3$, $BF_3$, $B(C_6F_5)_3$, $SnCl_4$, $TiCl_4$, $ZnCl_2$, $SnCl_2$, $CuCl_2$, combinations thereof, or complexes thereof with Lewis bases. Metallocene halides, such as zirconocene dichloride, titanocene dicloride, and hafnocene dichloride; metallocene halides in combination with methylalumoxane, and methylalumoxane can also be used.

Non-oxidizing Bronsted acids are preferred to prevent or minimize oxidation or oxidative degradation of the cyclic diene and/or the comonomer. Non-limiting examples include perfluoroalkanesulfonic acids, such as trifluoromethanesulfonic; perfluoroalkanoic acids, such as trifluoroacetic acid; and alkanesulfonic acids, such as methanesulfonic acid, ethanesulfonic acid, benzenesulfonic acid, and the like.

The polymerization reaction generally forms random copolymer comprising polymerized units derived from the cyclic diene and the comonomer. In some instances, the comonomer can act as a chain transfer agent, which can limit the molecular weight of the copolymer.

The reaction can be conducted by adding a mixture of the monomers to a mixture of the catalyst and solvent over a period ranging from 5 minutes to several hours, at a temperature from −100° to +120° C., or from −50° to 80° C., or from ambient temperature to 120° C., or from 50° C. to 80° C. The reaction period can vary depending on the reactivity of the monomers. Longer reaction periods may be required at lower reaction temperatures. After all the monomer is added, the resulting reaction mixture can be stirred, if needed, for an additional period ranging from 5 minutes to several hours until all the monomer has essentially disappeared, or alternately, until an analysis of the reaction mixture indicates that a copolymer product of sufficient molecular weight has been formed.

Depending on various factors, such as structure and reactivity of the monomers, nature of the reaction solvent, and temperature, the copolymer produced can remain fully soluble in the solvent, partly soluble in the solvent, or mostly insoluble in the solvent. Generally, it is preferred that the copolymer remain soluble in the solvent. In embodiments, the copolymers have a solubility in the hydrocarbon solvent of 10-80 wt. %, or 25-75 wt. %, or 35-65 wt. %, or 20-60 wt. %, or 30-50 wt. %, relative to the weight of the solvent.

At the end of the reaction, the copolymer can be isolated, if desired, by quenching the reaction mixture with water followed by separating the organic solvent layer and stripping the solvent. Trace organics can be removed from the product under high vacuum.

Crosslinked Copolymer: The copolymer obtained as described above has double bonds resulting from polymerization of the cyclic diene units. These double bonds are reactive to crosslinking agents, e.g., a radical generating compound as curing agent or curing initiator, which allows for preparing crosslinked copolymers. Free radical initiators are especially desirable. They generate radicals at elevated temperature or under the triggering effect of UV or other energy addition. Examples include sulfur-based agents, peroxide-based agents, tellurium, selenium, polysulfide polymers, metallic oxides, and di-isocyanates. Non-limiting examples of sulfur-based crosslinking agents include $S_2Cl_2$, elemental sulfur, and sulfur donor compounds that liberate sulfur under the crosslinking conditions. Some examples of sulfur donor compounds include tetramethyl thiuram disulfide, 4,4'-dithiodimorpholine, dipentamethylene thiruram tetrasulfide, and thiocarbamyl sulfenamide, dibenzothiazole, N-cyclohexyl-2-benzothiazole, zinc dimethyl dithiocarbamate, thiourea, xanthates, and thiophosphates.

The curing initiator or crosslinking agent, when used, is present in an amount of 0.1-10 wt %, or 0.3 to 7 wt. %, or 1 to 5 wt. %, based on the total weight of the copolymer.

Crosslinking of the copolymer chains can be achieved by reaction with the crosslinking agent at temperatures ranging from ambient to 90° C., or up to 300° C., or <=280° C., for up to 1 hour, or up to 30 minutes, or at least 5 minutes, to provide crosslinked copolymers. The crosslinking density depends on a number of factors such as the amount of the crosslinking agent, temperature and other physical conditions used. With $S_2Cl_2$ crosslinking agent, the crosslinking density can vary, for example, in a range of 1-10, corresponding to reaction of 1-10 molecules of $S_2Cl_2$ per 100 polymerized cyclic diene units.

In embodiments, after crosslinking (curing) and when dissolved in the hydrocarbon solvent forms a substantially gel-free solution, the crosslinked composition is characterized as having a gel content of above 50 wt. %, or >70 wt. %, or >90 wt. %, or >85 wt. %, relative to the overall weight of the copolymer.

The crosslinked polymers can have good chemical and oxidative stability. Crosslinking also results in raising the Tg of the resulting crosslinked copolymer, as seen from FIG. 1 for a copolymer made using CHD and alpha pinene in a weight ratio of 85:15, respectively. In embodiments at crosslinking densities up to 10, the Tg increases in an approximately linear manner; with crosslinking densities greater than 10, e.g., up to 20, does not increase in a significant increase in the Tg.

The crosslinked copolymers also have enhanced fire retardancy, one of the properties that makes them useful for applications as electronic materials. Fire retardance can be measured by measuring the time taken by a sample to completely form char from the time sample ignition is started.

Properties of the copolymer: The copolymer is generally resinous material. The copolymer formed by cationic polymerization of one or more cyclic dienes through cationic solution polymerization wherein: (i) the monomer is enchained through both 1,2- and 1,4-insertion modes; and (ii) the enchained unit goes through disproportionation reaction at the same time to convert part of the enchained cyclohexenyl into both phenyl and cyclohexane units. The chemical shift of phenyl and cyclohexane groups is distinct from the cyclohexenyl group. The conversion via cationic polymerization can be shown through both proton and/or carbon 13 NMR, e.g., with the presence of either phenyl group or cyclohexenyl to be detectable, e.g., above the NMR sensitivity level of >0.1%, or >0.2%, or >0.5%, based on the total weight of the PCHD composition.

With the conversion of the enchained cyclohexenyl into both phenyl and cyclohexane units, the final polymer Tg increases substantially with the conversion rate. In embodiments, at a conversion of 10% of the cyclohexenyl group, the polymer Tg increased from 100-120° C. to as high as 150-160° C. Additionally, the solubility of the copolymer significantly increases in hydrocarbon solvents, e.g., toluene, cyclohexane, etc.

In embodiments, copolymers prepared using the methods described above generally have a Mn of 300-5,000 Dalton, or 500-3,000 Dalton, or <2000 Dalton, or <1500 Dalton, or >500 Dalton. In embodiments, the copolymers prepared have a $M_z$ of 2000-30,000 Dalton, or 3,000-25,000 Dalton, or <20,000 Dalton, or <18,000 Dalton, or >2,500 Dalton, or >3,000 Dalton.

The copolymer is characterized as being soluble in hydrocarbon solvents, with a solubility ranging from 0.1-2 g of copolymer per gram of the solvent, or >0.2 g/g of solvent, or >1.0 g/g or solvent, or <1.5 g polymer per g of solvent, or >0.5 g/g of solvent, or 1 g of polymer per 1 g of solvent. It is desirable to have soluble copolymers as they are convenient for further downstream processing and applications. In embodiments, the copolymer solids when dissolved in the hydrocarbon solvent forms a substantially gel-free solution, wherein <15 wt. %, or <10 wt. %, or <5 wt. % of the solids remain insoluble in solvent, e.g., toluene or cyclohexane.

The copolymers have a glass transition temperature (Tg) of 80-180° C., or 85-170° C., or 90-150° C., or >95° C., or >100° C., or 90-160° C., measured using DSC (differential scanning calorimetry) or DMA (dynamic mechanical analyzer).

After crosslinking, the copolymers exhibit adhesion to metals such as aluminum, copper, etc. In embodiments, the crosslinked copolymers have an adhesion to metal given by a 180° C. peel strength of 0.2-1.5 N/m$^2$, or 0.5-1.25 N/m$^2$, or >0.50 N/m$^2$, or >0.8 N/m$^2$, or <1.8 N/m$^2$. Good adhesion to copper makes the copolymers valuable in electronic applications. The crosslinked polymers in embodiments have a Tg of 120° C. to 250° C., or 130-240° C., or >180° C., or >160° C., or >200° C.

The crosslinked copolymers in embodiments possess good electrical properties for use in PCB applications, including a low dissipation factor (Df) of <0.01, <0.006, or <0.0055, or in the range of 0.0025-0.0045, or 0.0035-0.0055; and a low dielectric constant (Dk) of <4.5, or <4.0, or <3.5, or in the range of 2-4.0, with Df and Dk being measured according to IPC TM-650 2.5.5.13.

The crosslinked copolymers exhibit good fire retardancy. Fire retardancy of a sample can be assessed by measuring the time taken from ignition, for a test sample to completely form a char, e.g., a fire retardance of less than or equal to 60 seconds, or <50 secs, or <40 secs from ignition time. In embodiments, the resin has a UL 94 rating of V-0, or at least V-1, or at least V-2 rating.

The crosslinked copolymers in embodiments possess good electrical properties for use in PCB applications, including a low dissipation factor (Df) of <0.01, <0.006, or <0.0055, or in the range of 0.0025-0.0045, or 0.0035-0.0055; and a low dielectric constant (Dk) of <4.5, or <4.0, or <3.5, or in the range of 2-4.0, with Df and Dk being measured according to IPC TM-650 2.5.5.13.

The crosslinked copolymers further have low moisture absorption, resulting in a substrate that is less sensitive to environmental conditions both in use and during storage. In embodiments, the moisture absorption is 0.05-0.5%, or <0.3%, or <0.2% after immersion in water at 23° C. for 24 hours.

The crosslinked copolymers further exhibit excellent thermal conductivity, on the order of 0.2 to 0.7 Watts per meter-Kelvin (W/mK), or 0.3 to 0.5 W/mK, or >0.1 W/mK.

The crosslinked copolymer is particularly suitable for electronic applications, e.g., a higher Tg of 140° C.-250° C., adhesion to metal given by a 180° C. peel strength of >0.35-0.5 N/m$^2$, a low dissipation factor (Df) of 0.0025-0.0055%, a fire retardance of less than or equal to 20 seconds from ignition time, and a low dielectric constant (Dk) of 2.0-3.0. Crosslinked copolymers made using sulfur-based crosslinking agents exhibit even better fire retardancy than pre-crosslinked copolymer.

Uses of the copolymer in electronic applications: The copolymers are valuable materials for forming electronic components, such as printed circuit boards (PCBs) and flexible printer circuits (FPC). Prepregs, which are used for making the PCBs, can be made using the copolymers. For the prepregs, the crosslinked copolymer is used in combination with a rubber component.

The rubber component includes both natural rubber and its various raw and reclaim forms, as well as various synthetic rubbers. In embodiments, the rubber component comprises any of elastomer block copolymers, unsaturated diene elastomer selected from polybutadienes, natural rubber, synthetic polyisoprenes, butadiene copolymers, isoprene copolymers and mixtures thereof.

In embodiments, the rubber is selected from butyl rubber, halogenated butyl rubber, and EPDM (Ethylene Propylene Diene Monomer rubber), and mixtures thereof. In embodiments, the rubber component is selected from natural rubber (NR), styrene-butadiene rubber (SBR), butadiene rubber, synthetic polyisoprene rubber, epoxylated natural rubber, polybutadiene rubber, e.g., high-cis polybutadiene rubber; nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methyl styrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

Examples of SBR rubber include an emulsion-polymerized styrene-butadiene rubber (un-modified E-SBR), a solution-polymerized styrene-butadiene rubber (un-modified S-SBR) and modified SBRs obtained by modifying terminals (modified E-SBR and S-SBR). The rubber component comprises components other than SBR and BR such as natural rubber (NR), isoprene rubber (IR), epoxidized natural rubber (ENR), butyl rubber, acrylonitrile butadiene rubber (NBR), ethylene propylene diene rubber (EPDM), chloroprene rubber (CR) styrene-isoprene-butadiene rubber (SIBR), used alone or in combinations.

The rubber component may be coupled, star-branched, branched, and/or functionalized with a coupling and/or star-branching or functionalization agent. The branched rubber can be any of branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

When made into prepreg compositions, the composition may further comprise one or more additives comprising but not limited to a multi-functional co-curable additive, a diene based rubber, a halogenated or non-halogenated flame retardant, an inorganic or organic filler or fiber, mono vinyl compounds or other additives known in the art such as an antioxidant, a colorant or a stabilizers, an adhesion promotor, a toughened, a film forming additive, in amounts ranging from 0.1 to 50 wt. % of the resin composition.

Compositions comprising the copolymers can be laminated onto a metal substrate, e.g., copper. The laminates exhibit several useful properties that make them valuable for electronic applications, such as: a low level or no blistering or delamination after subjecting the laminate to a pressure cooker test; a low level or no decomposition during lead-free soldering, chemical resistance against acid, alkaline and oxidative substances, no or low water uptake, good resistance against inner laminate electro-migration, i.e., resistance to CAF (conductive anodic filament) failure, low coefficient of thermal expansion (CTE), high glass transition temperature for stable performance under use conditions.

The copolymers are valuable as dielectric materials as they have a good balance of electrical properties, thermal stability, good thermomechanical and thermal properties for good dimensional stability, and chemical stability. The electrical properties include a low dielectric constant, low dielectric loss and leakage current, Df and Dk, high breakdown voltage, stable and high adhesion to metals such as copper under use conditions, low to no impact on copolymer resin flow of prepregs for press process, and satisfactory optical qualities, e.g., no agglomerates of the laminate material.

When used a prepreg, the composition further comprises a reinforcing material. The prepreg is used in making metal foil clad laminate, with a sheet of the prepreg and a metal foil clad on one side or both sides of the prepreg.

EXAMPLES: The following examples are provided to illustrate the disclosure.

Example 1—Preparation of 1,3-cyclohexadiene-co-α-pinene copolymer resin (A): A baffled 1 L round bottom reactor flask was equipped with a stirrer blade, nitrogen inlet, pressure outlet and temperature probe. 300 gram of toluene solvent (containing 230 ppm of water) was charged to the reactor. 10.0 gram $AlCl_3$ was charged to the reactor and the reactor content heated to 45° C. A monomer mixture consisting of 150 gram of 1,3-cyclohexadiene and 150 gram α-pinene was added slowly to the reactor in 40 min. by membrane pump. The reactor temperature was kept at 45° C. during monomer addition by cooling with a water/ice bath. Upon completion of the monomer addition the reactor was kept at 45° C. for an additional 15 min. A diluted sulfuric acid solution was prepared by adding 4.3 gram of concentrated sulfuric acid to 150 ml of water. The diluted sulfuric acid solution was charged to the reactor, stirring was continued and the temperature was increased to 80° C. After 20 min. the stirring was stopped, the aqueous and the organic layers were allowed to separate and the aqueous layer was removed. An additional water wash was performed, after which 1.1 gram of sodiumcarbonate dissolved in 150 ml water was charged to the reactor. After 20 min. the aqueous and organic layers were allowed to separate and the aqueous layer removed, followed by an additional water wash and removal of the aqueous layer. The solvent was removed from the organic fraction by distillation and the molten resin heated stepwise to 240° C. Residual solvent, monomer and light oils were removed by nitrogen stripping for 15 min. The molten resin was discharged from the reactor. 1,3-cyclohexadiene-co-α-pinene copolymer resin A was obtained with Mettler Cup & Ball Softening point ($T_{sp}$) of 148° C. and 79% yield.

Example 2—Preparation of 1,3-cyclohexadiene-co-α-pinene copolymer resin (B): A baffled 1 L round bottom reactor flask was equipped with a stirrer blade, nitrogen inlet, pressure outlet and temperature probe. 374 gram of toluene solvent (containing 230 ppm of water) was charged to the reactor. 9.1 gram aluminum trichloride was charged to the reactor and the reactor content heated to 45° C. A monomer mixture consisting of 238 gram of 1,3-cyclohexadiene and 42 gram α-pinene was added slowly to the reactor in 40 min. by membrane pump. The reactor temperature was kept at 45° C. during monomer addition by cooling with a water/ice bath. Upon completion of the monomer addition the reactor was kept at 45° C. for an additional 15 min. A diluted sulfuric acid solution was prepared by adding 3.7 gram of concentrated sulfuric acid to 150 ml of water. The diluted sulfuric acid solution was charged to the reactor, stirring was continued and the temperature was increased to 80° C. After 20 min. the stirring was stopped, the aqueous and the organic layers were allowed to separate and the aqueous layer was removed. An additional water wash was performed, after which 1.1 gram of sodiumcarbonate dissolved in 150 ml water was charged to the reactor. After 20 min. the aqueous and organic layers were allowed to separate and the aqueous layer removed, followed by an additional water wash and removal of the aqueous layer. The solvent was removed from the organic fraction by distillation and the molten resin heated stepwise to 280° C. Residual solvent, monomer and light oils were removed by nitrogen stripping for 1 min. The molten resin was discharged from the reactor. 1,3-cyclohexadiene-co-α-pinene copolymer resin B was obtained with Mettler Cup & Ball Softening point (C&B SP) of 172° C. and 92% yield. Table 1 shows the $T_{sp}$, Tg, yield, Mn, Mw and $M_z$ for the 1,3-cyclohexadiene based copolymer resins A and B. Molecular weights are in Dalton (Da).

TABLE 1

| Product | $T_{sp}$ (° C.) | Tg (° C.) | Mn (Da) | Mw (Da) | Mz (Da) | PDI | Yield (%) |
| --- | --- | --- | --- | --- | --- | --- | --- |
| Resin A | 148 | 85 | 638 | 1319 | 2736 | 2.1 | 79 |
| Resin B | 172 | 100 | 790 | 3193 | 24972 | 4.9 | 92 |

Example 3—Preparation of 1,3-cyclohexadiene-co-α-pinene copolymer resin (C): A 100 ml round bottom reactor flask was equipped with a magnetic stirrer bar, nitrogen inlet, pressure outlet and temperature probe. 40 gram of toluene solvent (containing 230 ppm of water) was charged to the reactor followed by 1.5 gram $AlCl_3$. A monomer mixture of 1,3-cyclohexadiene (25.5 g) and α-pinene (4.5 g) was added slowly via dropping funnel to the reactor in 10 min. The reactor temperature was kept at 45° C. during monomer addition by cooling with a water/ice bath. Upon completion of the monomer addition the reactor was kept at 45° C. for an additional 10 min. A diluted sulfuric acid solution was prepared by adding 1.0 gram of concentrated sulfuric acid to 50 ml of water. The diluted sulfuric acid solution was charged to the reactor, stirring was continued. After 20 min. the stirring was stopped, the aqueous and the organic layers were allowed to separate and the aqueous layer was removed. An additional water wash was performed and the organic layer discharged from the reactor. The Mn, Mw and $M_z$ were determined on the resin solution by size exclusion chromatography. The Tg was determined on the material obtained by removing the solvent by placing 3 gram of resin solution in a Mettler HG53 halogen moisture analyzer at 150° C. for 15 min. Resin C was obtained with a Tg of 107° C. Resin D through H were obtained in a similar fashion with the conditions as listed in table 2.

Example 4: Preparation of 1,3-cyclohexadiene-co-α-pinene and 1,3-cyclohexadiene-co-α-methylstyrene copolymer resins (D-H): The procedure as described for making Resin C was used, except that the amounts of the 1,3-CHD and the comonomer were varied. Table 2 summarizes the monomer composition, reactants and reaction conditions used to prepare the 1,3-cyclohexadiene-co-α-pinene copolymer resins D-H. Table 3 summarizes the $T_{sp}$, Tg, Mn, Mw and $M_z$ for the copolymer resins C through H.

TABLE 2

| Product | Monomer composition | Solvent (g) | Reaction | AlCl$_3$ |
|---|---|---|---|---|
| Resin C | 25.5 g CHD + 4.5 g α-pinene | Toluene (40) | 45 | 1.3 |
| Resin D | 25.5 g CHD + 4.5 g α-methyl-styrene | Toluene (40) | 45 | 1.3 |
| Resin E | 15 g CHD + 15 g α-pinene | Toluene (40) | 45 | 1.2 |
| Resin F | 15 g CHD + 15 g α-methyl-styrene | Toluene (40) | 45 | 1.2 |
| Resin G | 21 g CHD + 9 g α-pinene | Toluene (40) | 45 | 1.2 |
| Resin H | 18 g CHD + 12 g α-pinene | Toluene (40) | 45 | 1.3 |

TABLE 3

| Product | $T_{sp}$ (° C.) | Tg (° C.) | Mn | Mw | Mz (Da) | PDI |
|---|---|---|---|---|---|---|
| Resin C | N/A | 107 | 1098 | 4913 | 16509 | 4.5 |
| Resin D | N/A | 107 | 1211 | 4774 | 15669 | 3.9 |
| Resin E | 154 | 58 | 564 | 1475 | 3373 | 2.6 |
| Resin F | 110 | 43 | 578 | 1361 | 3253 | 2.4 |
| Resin G | N/A | 96 | 802 | 2570 | 6469 | 3.2 |
| Resin H | N/A | 65 | 670 | 1922 | 4767 | 2.9 |

Example 4: Fire retardancy of the copolymer resins was tested on copolymer resins obtained by crosslinking the copolymer with $S_2Cl_2$. The parameter "T" represents the time between the ignition start time and flameout time, corresponding to complete char formation. "RU" denotes the residual unsaturation level in the copolymer resin, given by the mol % of C=C groups. "RU" and wt. % chloride are estimated based on 100% consumption of sulfide monochloride. The results are shown in Table 4.

TABLE 4

| Copolymer Resin Example | CHD:α-Pinene wt. ratio (Resin Type) | RU (mol %) | Wt. % chloride | T (secs) |
|---|---|---|---|---|
| J | 85:15 | 0 | 0 | 41 |
| K | (Resin B) | 1 | 0.7 | 33 |
| L | | 5 | 3.5 | 11 |
| M | | 10 | 6.6 | 21 |
| N | | 20 | 11.7 | 7 |
| O | 50:50 | 0 | 0 | 63 |
| P | (Resin A) | 1 | 0.4 | 80 |
| Q | | 5 | 2.1 | 14 |

TABLE 4-continued

| Copolymer Resin Example | CHD:α-Pinene wt. ratio (Resin Type) | RU (mol %) | Wt. % chloride | T (secs) |
|---|---|---|---|---|
| R | | 10 | 4.1 | 12 |
| S | | 20 | 7.6 | 12 |

Example 5: The crosslinked resins in example 4 are measured for peel strength, Tg, Dk, and Df. Dissipation factor (Df) and Dk are measured according to according to IPC TM-650 2.5.5.13. The samples are expected to have Dk (10 Ghz) in the range of 3.3 to 3.7, Df (10 Ghz) in the range of 0.0035 to 0.0045, Tg of 160-180° C., and peel strength of 0.5 to 1.5 N/m$^2$.

Examples 6-9: In the examples, 80 parts by weight of the Resin (A, B, C, and D respectively) is mixed with 50 parts by weight of methylbenzene as a solvent, thereby completely dissolving into a resin solution, then add 20 parts by weight of triallyl isocyanurate (TAIC) as a crosslinking agent, 3 parts by weight of dicumyl peroxide DCP as an initiator, 15 parts by weight of ethylene bis(tetrabromo phthalimide) as a bromine-containing flame retardant, and 45 parts by weight of silica SO—C2 as a filler into the solution. The mixture is stirred to dissolve into a uniform resin composition, namely a glue solution.

The prepared uniform glue solution is next used to saturate E-fiberglass cloth and heat and dry the E-fiberglass cloth at 155° C. for 3-10 minutes to completely volatilize the solvent, thereby obtaining prepregs. Overlap pieces of the prepared prepregs, then clad two pieces of 35-m-thick copper foils to the to two surfaces of the overlapped prepregs. Process the assembly of the two copper foils and eight prepregs by heat pressing at a temperature of 200° C. and a pressure of 3.0 MPa for 90 minutes, thereby obtaining a double-sided copper clad laminate. The samples are measured for peel strength, Tg, Dk, and Df. Dissipation factor (Df) and Dk are measured according to according to IPC TM-650 2.5.5.13. The samples are expected to have Dk (10 Ghz) in the range of 3.3 to 3.5, Df (10 Ghz) in the range of 0.0025 to 0.0035, Tg of 160-180° C., and peel strength of 0.5 to 1.5 N/m$^2$.

Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Unless defined otherwise, all technical and scientific terms used herein have the same meanings as commonly understood by one of skill in the art to which the present disclosure belongs. Publications cited herein and the materials for which they are cited are specifically incorporated by reference.

Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A copolymer formed by cationic polymerization of one or more cyclic dienes, and a comonomer in the presence of a catalyst, wherein
   the comonomer is selected from the group consisting of a monoterpene, a branched styrene, and combinations thereof;
   the one or more cyclic dienes is selected from the group consisting of 1,3-cyclohexadiene (CHD), cyclopentadiene (CPD), 1,3-cycloheptadiene, 4,5,6,7-tetrahydroindene, norbornadiene (NBD), and combinations thereof;
   the catalyst is selected from the group consisting of a Bronsted acid, a Lewis acid, and combinations thereof;
   the copolymer has a Mn of 300-5,000 Dalton and a Mz of 2000-30,000 Dalton;
   the copolymer has
      (i) a solubility in a hydrocarbon solvent of 0.1 to 2 g of the copolymer per gram of the hydrocarbon solvent, and
      (ii) a Tg of 80° C. to 180° C.

2. The copolymer of claim 1, wherein the copolymer contains at least 0.1 wt. % of phenyl groups as measured by proton NMR.

3. The polymer of claim 1, wherein the branched styrene comprises any of α-methylstyrene, 1,1-diphenylethylene, or combinations thereof.

4. The polymer of claim 1, wherein the monoterpene is selected from the group consisting of α-pinene, β-pinene, limonene, myrcene, ocimene, α-phellandrene, β-phellandrene, farnesene, camphene, α-terpinene, sabinene, γ-terpinene, α-terpinene, 3-carene, and combinations thereof.

5. The copolymer of claim 1, wherein the one or more cyclic dienes comprises a cyclic conjugated diene, and wherein the cyclic conjugated diene is 1,3-cyclohexadiene containing up to 10 wt. % of 1,4-cyclohexadiene, relative to the overall weight of cyclic conjugated diene.

6. The copolymer of claim 1, wherein the one or more cyclic dienes comprises a cyclic conjugated diene, and wherein the cyclic conjugated diene comprises polymerized 1,4-addition units and polymerized 1,2-addition units in molar ratio from 90:10 to 10:80.

7. The copolymer of claim 1, having a molar ratio of one or more cyclic dienes to comonomer ranging from 5:95 to 95:5.

8. The copolymer of claim 1, wherein the catalyst is a Lewis catalyst, and wherein the Lewis acid catalyst comprises a Group 3-8 or Group 12-15 metal and one or more electron-withdrawing groups.

9. The copolymer of claim 1, wherein the copolymer has a solubility in the hydrocarbon solvent ranging from 10 wt % to about 80 wt %, relative to the weight of the hydrocarbon solvent.

10. The copolymer of claim 1, wherein the hydrocarbon solvent is selected from the group of aromatic hydrocarbons, alicyclic or aliphatic hydrocarbons, and combinations thereof.

11. The copolymer of claim 1, wherein
   the comonomer is selected from the group consisting of α-methylstyrene, 1,1-diphenylethylene, α-pinene, β-pinene, limonene, myrcene, ocimene, α-phellandrene, β-phellandrene, farnesene, camphene, α-terpinene, sabinene, γ-terpinene, α-terpinene, 3-carene, and combinations thereof;
   the one or more cyclic dienes comprises a cyclic conjugated diene, and wherein the cyclic conjugated diene is 1,3-cyclohexadiene containing up to 10 wt. % of 1,4-cyclohexadiene, relative to the overall weight of cyclic conjugated diene;
   the copolymer has 5-95 mol % of polymerized units derived from 1,3-cyclohexadiene, and 95-5 mol % of polymerized units derived from the comonomer;
   the copolymer contains at least 0.1 wt. % of phenyl groups as measured by proton NMR.

12. A crosslinked polymer formed by reaction of the copolymer of claim 1 with a crosslinking agent selected from the group of sulfur-based agents, peroxide-based agents, tellurium, selenium, polysulfide polymers, metallic oxides, di-isocyanates, and combinations thereof.

13. The crosslinked polymer of claim 12, having one or more of:
   (i) a Tg of 140° C. to 250° C.,
   (ii) a 180° peel strength to copper of 0.2 to 1.5 N/m$^2$,
   (iii) a dissipation factor of 0.0025-0.0045 according to IPC TM-650 2.5.5.13,
   (iv) a dielectric constant Dk of <4.5 according to IPC TM-650 2.5.5.13, and
   (v) a fire retardancy, corresponding to the time taken for complete char formation, measured from sample ignition time, of less than or equal to 40 seconds.

14. A prepreg composition comprising the crosslinked polymer of claim 13, a reinforcing material, and a rubber.

15. A method for forming a copolymer, the method comprising:
   cationically polymerizing a monomer comprising one or more cyclic dienes and a comonomer in the presence of a catalyst and in a hydrocarbon solvent, forming the copolymer; and
   recovering the copolymer;
   wherein
   the catalyst is selected from the group consisting of a Bronsted acid, a Lewis acid, and combinations thereof;
   the comonomer is selected from the group consisting of a monoterpene, a branched styrene, and combinations thereof;
   the one or more cyclic dienes is selected from the group consisting of 1,3-cyclohexadiene (CHD), cyclopentadiene (CPD), 1,3-cycloheptadiene, 4,5,6,7-tetrahydroindene, norbornadiene (NBD), and combinations thereof; and wherein
the copolymer has a Mn of 300-5,000 Dalton and a Mz of 2000-30,000 Dalton;
the copolymer has
  (i) a solubility in a hydrocarbon solvent of 0.1 to 2 g of the copolymer per gram of the hydrocarbon solvent, and
  (ii) a Tg of 80° C. to 180° C.

16. The method of claim 15, wherein the copolymer contains at least 0.1 wt. % of phenyl groups as measured by proton NMR.

17. The method of claim 15, wherein the one or more cyclic dienes comprises a cyclic conjugated diene, and wherein the cyclic conjugated diene comprises polymerized 1,4-addition units and polymerized 1,2-addition units in molar ratio from 90:10 to 10:80.

18. The method of claim 15, wherein the cationically polymerizing is at a reaction temperature of −100° C. to 120° C.

19. The method of claim 15, wherein the catalyst is selected from the group consisting of $AlCl_3$, $TiCl_4$, $SnCl_4$, $B(C_6F_5)_3$, $BF_3$ and complexes thereof with Lewis bases, methylalumoxane, metallocene halides and combinations thereof with methylalumoxane, and combinations thereof.

20. The method of claim 19, further comprising crosslinking the recovered polymer with a crosslinking agent to provide a crosslinked copolymer, wherein the crosslinking agent is selected from the group of sulfur-based agents, peroxide-based agents, tellurium, selenium, polysulfide polymers, metallic oxides, di-isocyanates, and combinations thereof.

* * * * *